United States Patent [19]

Hiramitsu et al.

[11] Patent Number: 5,002,306
[45] Date of Patent: Mar. 26, 1991

[54] STEERING WHEEL

[75] Inventors: Tetsushi Hiramitsu, Ichinomiya; Satoshi Ohno, Inazawa, both of Japan

[73] Assignee: Toyoda Gosei Co., Ltd., Nishikasugai, Japan

[21] Appl. No.: 309,856

[22] Filed: Feb. 14, 1989

[30] Foreign Application Priority Data

Apr. 21, 1988 [JP] Japan .............. 63-53767[U]

[51] Int. Cl.5 .............................................. B60R 21/16
[52] U.S. Cl. ..................................... 280/731; 200/61.54
[58] Field of Search ............... 280/728, 731, 743, 750, 280/748; 200/61.57, 61.56, 61.55, 61.54

[56] References Cited

U.S. PATENT DOCUMENTS

| 3,819,205 | 6/1974 | Dunford et al. | 280/731 |
|---|---|---|---|
| 4,148,503 | 4/1979 | Shiratori et al. | 280/731 |
| 4,325,568 | 4/1982 | Clark et al. | 200/61.55 X |
| 4,334,699 | 6/1982 | Patzelt et al. | 280/731 |
| 4,575,117 | 3/1986 | Uchida | 280/750 |
| 4,578,592 | 3/1986 | Nakazawa et al. | 200/61.54 X |
| 4,612,425 | 9/1986 | Kanai et al. | 200/61.55 |
| 4,638,131 | 1/1987 | Kidd et al. | 200/61.55 |
| 4,714,806 | 12/1987 | Invi et al. | 200/61.55 |
| 4,934,735 | 6/1990 | Embach | 280/731 |

FOREIGN PATENT DOCUMENTS 55-110643  8/1980  Japan .

Primary Examiner—Charles A. Marmor
Assistant Examiner—Tamara L. Finlay
Attorney, Agent, or Firm—Cushman, Darby & Cushman

[57] ABSTRACT

An air bag device is provided on upper side of a boss portion. The air bag device comprises an air bag, an inflater supplying gas to the air bag, a backup plate holding the air bag and the inflater, and a pad in box shape for covering the air bag. A thin breaking portion is formed on an upper wall of the pad so as to break the upper wall in state of connecting the upper wall to the side wall when the air bag is expanded, and a plurality of membrane switches comprising a pair of electrodes in thin film shape are arranged at portions of the upper wall of the pad except for the breaking portion. A connector connected to a prescribed electric circuit at lower side of the boss portion and the membrane switches are electrically connected by lead wires arranged along a pad side wall portion in state of connecting the pad upper wall when the pad upper wall is broken.

5 Claims, 2 Drawing Sheets

STEERING WHEEL

BACKGROUND OF THE INVENTION

1. Field of the Invention

The present invention relates to a steering wheel wherein an air bag device comprising an air bag expanded at a prescribed time and a pad covering the air bag and having a thin breaking portion formed on an upper wall thereof and broken at the expanded state of the air bag is arranged on the upper side of a boss portion, and the pad is provided with prescribed switches.

2. Description of the Prior Art

In the prior art, in such a steering wheel, a horn switch is arranged between an air bag device and a boss portion, and a pad of the air bag device is depressed against the biasing force of a spring for biasing the air bag device upwards and the air bag device is moved downward, thereby a horn is actuated (refer to U.S. Pat. No. 4,334,699).

Also as shown in U.S. Pat. No. 3,819,205, in another steering wheel, four horn switches are installed on four spoke portions respectively.

SUMMARY OF THE INVENTION

In the above-mentioned horn switch, since the air bag device to be depressed is considerably heavy and liable to resonance by vibration transmitted from the steering shaft, the resilience of the spring may be raised so as to prevent the resonance.

If the resilience of the spring is raised, however, the pad must be depressed strongly during operating the horn and the operation feeling will be deteriorated.

Also when the horn switches are arranged on the spoke portions, the arrangement space is limited and therefore it is difficult to arrange switches other than the horn switches.

In order to solve the above-mentioned problems in the prior art, an object of the invention is to provide a steering wheel having an air bag device, wherein the operation feeling of a switch installed on an upper wall of a pad can be improved, and a plurality of switches other than the horn switch can be also arranged on the upper wall of the pad.

The foregoing object can be attained by a steering wheel having an air bag device, which is provided with a ring portion, a boss portion arranged at the center of the ring portion, a spoke portion connecting between the ring portion, and the boss portion, and an air bag device installed on the upper side of the boss portion, the air bag device comprising an air bag expanded at the prescribed time; an inflater supplying gas to expand the air bag; a backup plate arranged on upper side of the boss for holding the air bag and the inflater; a pad formed in a box shape with an upper wall and a side wall extending downward from periphery of the upper wall, and covering upper side and lateral side of the air bag and connecting the side wall to the backup plate, and having a thin breaking portion on the upper wall so as to break the upper wall open on condition that the upper wall remains connected to the side wall at the expanded state of the air bag; a plurality of membrane switches arranged at portions of the pad upper wall except for the breaking portion and comprising a pair of electrodes in thin film shape; a connector arranged at lower side of the boss portion and connected to a prescribed electric circuit; and lead wires connecting between the membrane switches and the connector electrically and arranged along the pad side wall portion in state of connecting the pad upper wall at breaking state of the pad upper wall.

According to the above-mentioned construction, in the steering wheel of the invention, since no switch is arranged between the air bag device and the boss portion, the air bag device with heavy weight need not be supported by the spring with high resilience and the resonance of the air bag device can be suppressed.

Also the membrane switch used as a switch can function as a switch only by pushing it so weakly that a pair of electrodes in thin film shape contact, thereby the operation feeling can be improved.

Further the membrane switch is arranged at a portion of the pad upper wall except for the breaking portion, and the lead wires electrically connected between the membrane switch and the connector at the lower side of the boss portion are arranged along the pad side wall portion and also remote from the braking portion. Therefore the membrane switch and the lead wires are not arranged across the breaking portion of the pad upper wall, thereby when the expansion of the air bag is accompanied by the breaking of the pad upper wall, the breaking portion of the pad upper wall can be smoothly broken.

Moreover, since the membrane switch is arranged on the wide pad upper wall, switches other than the horn switch can be installed and a plurality of memebrane switches can be installed on the pad of the steering wheel.

DESCRIPTION OF THE PREFERRED EMBODIMENTS

Figure 1:
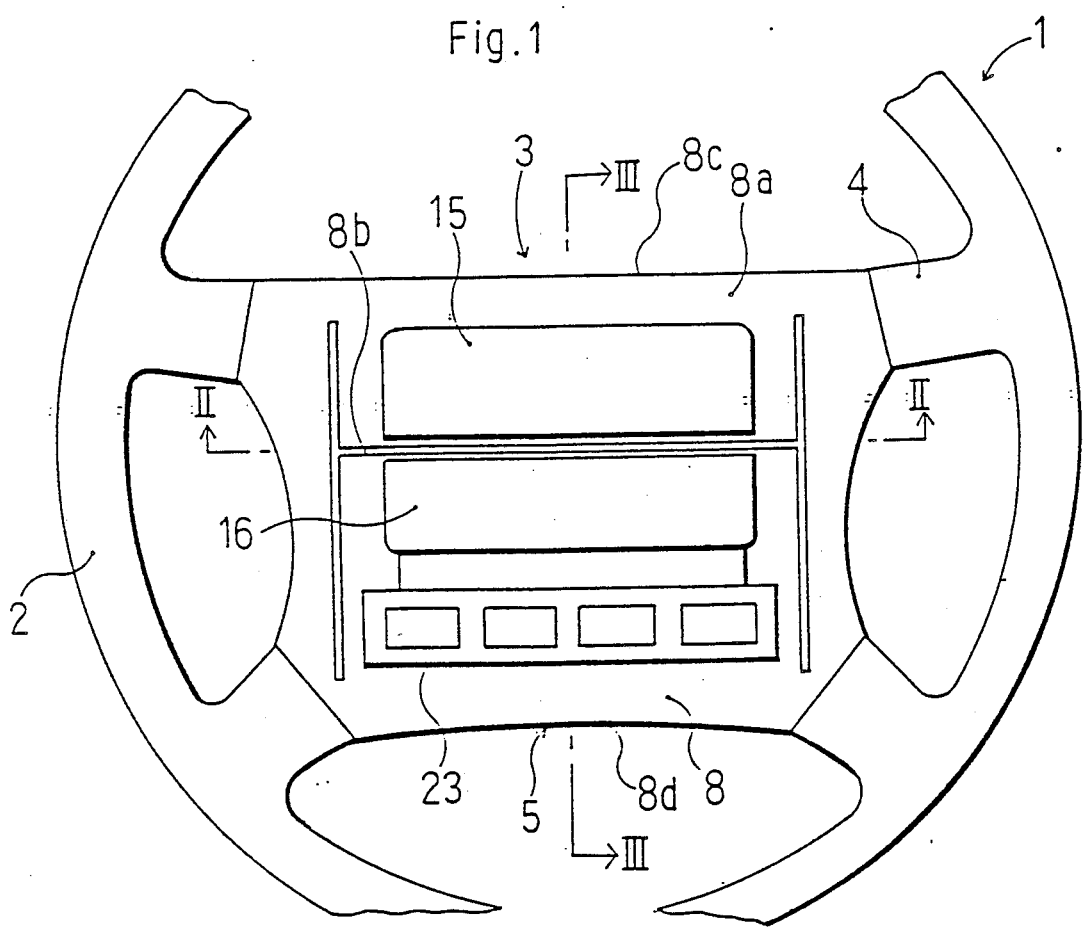
FIG. 1 is a plan view of a steering wheel as an embodiment of the invention.

Preferred embodiments of the invention will now be described referring to the accompanying drawings.

A steering wheel 1 in an embodiment shown in FIGS. 1–4 is provided with a ring portion 2, a boss portion 3 arranged at the center of boss portion 2, and a spoke portion 4 connecting between the ring portion 2 and the boss portion 3, and also an air bag device 5 is installed on upper side of the boss portion 3.

The air bag device 5 is provided with an inflater 6, an air bag 7, a pad 8 and a backup plate 9.

The air bag 7 expands in spherical form if gas from the inflater 6 is put into it, and is folded and enclosed within the pad 8 at normal state.

The inflater 6 evaporates a gas generating agent within it at prescribed time and generates gas, and is formed in dish-like shape. A plurality of gas ejection ports 6b are formed on upper side of the inflater 6, and a flange portion 6a is formed at intermediate position thereof in the vertical direction.

The backup plate 9 is of rectangular dish-like shape and provided at the center of the bottom wall with an insertion hole in which the upper side of the inflater 6 is inserted from lower side. A circular gas inlet port 7b of the air bag 7 and the dish shaped flange portion 6a of the inflater 6 are fixed to the periphery of the insertion hole utilizing a bolt 11 and an annular fitting 7a. When the air bag 7 and the inflater 6 fixed to the backup plate 9 using the bolt 11, a holder 10 used to hold the pad 8 to the backup plate 9 is arranged between the backup plate 9 and the flange portion 6a of the inflater 6 (refer to FIG. 3). The holder 10 is of rectangular dish-like shape, and provided at the center of the bottom wall with an insertion hole in which the upper side of the inflater 6 is inserted from the lower side and with an upper projection wall which is projected upward from both edges in the longitudinal direction of the steering wheel 1 on the bottom wall and inserted in the side wall of the pad 8 (refer to FIG. 3). In addition, both edges in the lateral direction of the steering wheel 1 on the bottom wall of the holder 10 are bent downward (refer to FIG. 2).

Figure 2:
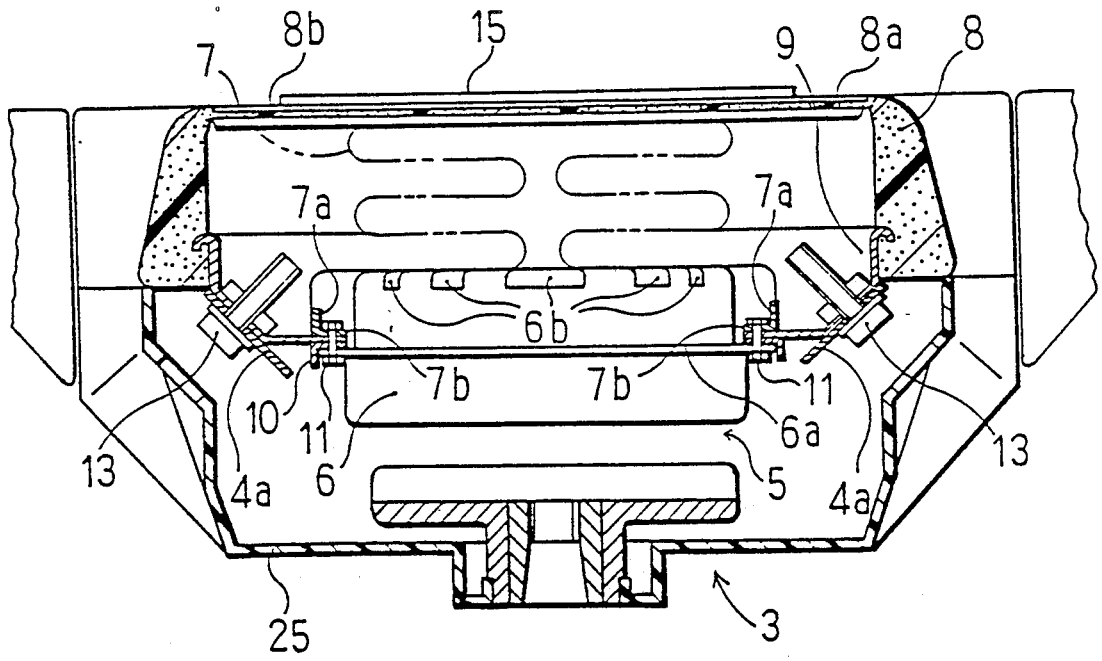
FIG. 2 is a sectional view taken in line II—II of FIG. 1.

Since both lateral side walls of the backup plate 9 are fixed using a bolt 13 to support plates 4a, 4a connected to a core (not shown) of the steering wheel, the air back device 5 integrated utilizing the bolt 11 is arranged on upper side of the boss portion 3 (refer to FIG. 2).

Figure 3:
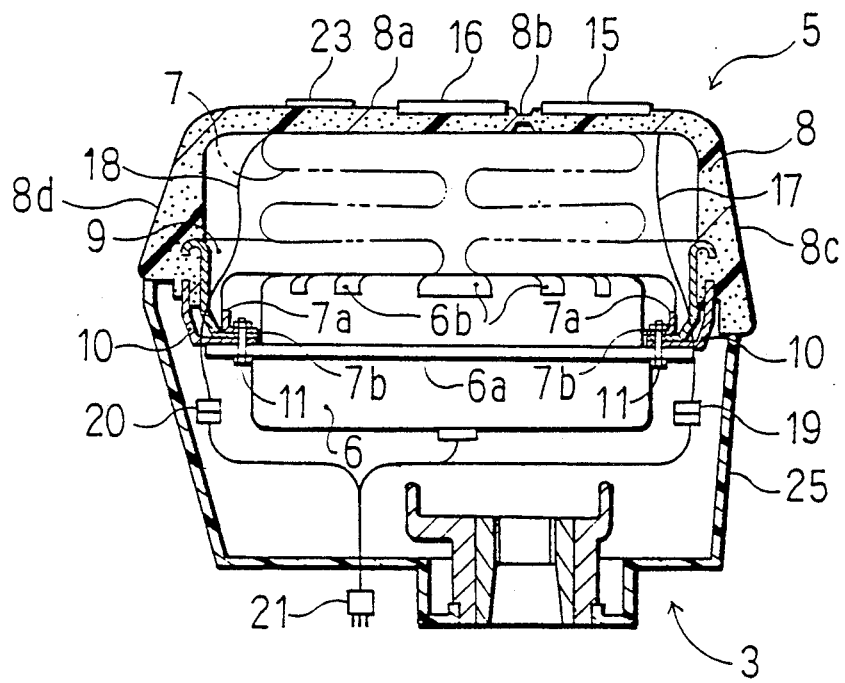
FIG. 3 is a sectional view taken in line III—III of FIG. 1.

The pad 8 of the air bag device 5 is made of soft synthetic resin such as urethane, polyvinyl chloride or the like, and formed in a rectangular box shape with an upper wall and four side walls extending downward from periphery of the upper wall. As shown in FIG. 3, both side walls 8c, 8d in the longitudinal direction of the steering wheel 1 are inserted by the upper projection wall of the holder 10, thereby the pad 8 is held to the backup plate 9. When the air bag device 5 is integrated by the bolt 11, the pad 8 is held to the backup plate 9 and covers the folded air bag 7. A break-open area defined by a thinned breaking portion 8b in H-like shape is formed on the upper wall 8a of the pad 8 as shown in FIG. 1, so that when the air bag 7 is expanded the upper wall 8a remains connected to the pad side wall. With respect to the breaking portion 8b extending in the lateral direction on the upper surface of the upper wall 8a, two membrane switches 15, 16 of plane rectangular shape are applied and arranged to portions except for the lines of the H defining the breaking portion 8b.

Figure 4:
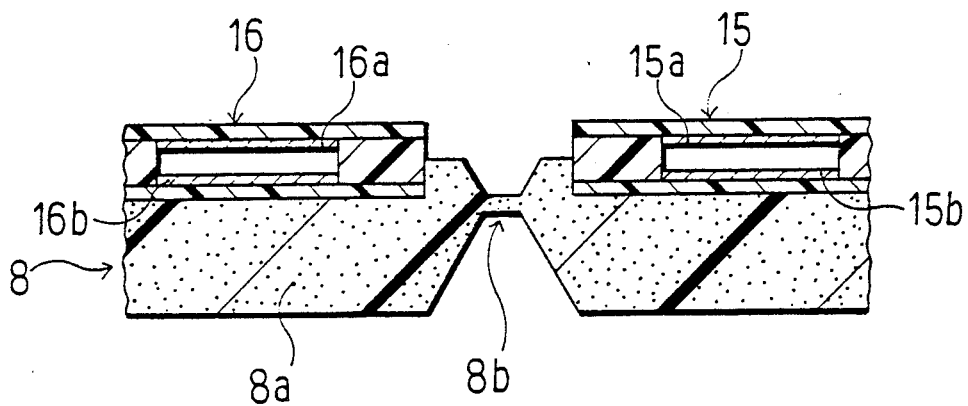
FIG. 4 is an enlarged fragmentary sectional view of membrane switches used in the embodiment.

These membrane switches 15, 16 are constituted respectively by a pair of electrodes 15a, 15b and 16a, 16b of thin film shape comprising a polyester film or the like as shown in FIG. 4. Lead wires 17, 18 connected respectively to the membrane switches 15, 16 are arranged along pad side wall portions 8c, 8d which extend in the axial direction of the steering wheel 1.

These lead wires 17, 18 are connected respectively through intermediate connectors 19, 20 to a connector 21 at lower side of the boss portion 3. When the steering wheel 1 is installed to the vehicle, the connector 21 is connected to prescribed lead wires, a light communication apparatus and the like hence to a horn actuating circuit within the vehicle. In this case, if a part of each of the membrane switches 15, 16 is pushed, electrodes 15a, 15b and 16a, 16b respectively are contacted with each other thereby actuating the horn mechanism. Since the connector 21 is also connected to a lead wire connected to the inflater 6, it is connected to an electric circuit within the vehicle to generate gas in the inflater 6.

Consequently, in the steering wheel 1 of the embodiment, a spring of high resilience to urge the air bag device upward as in the prior art need not be used, but the horn mechanism can be actuated only by weakly pushing the membrane switches 15, 16, thereby the operation feeling of the horn can be improved. Further, since the air bag device need not be moved downward to actuate the horn mechanism, resonance of the air bag device can be suppressed, and clearance for the downward motion need not be proveded between the lower cover 25 and the spoke portion 4 and the pad 8 thereby the appearance beauty also can be improved.

Also in this embodiment, as shown in FIG. 1, the membrane switch 16 is at rear (lower) side, of switch 15 and a membrane switch group 23 composed of four membrane switches separate from the membrane switches 15, 16 is installed further to the rear (lower) side of the membrane switch 16 Individual switches in the membrane switch group 23 function as switches for autodrive, air-conditioning, a radio, a telephone or the like. Thus the switches for objects other than the horn mechanism can be installed on the upper wall of the pad 8 of the steering wheel 1 to enable the easiest operation of the driver, and the driver can operate the switches at this position, thereby the operability of a plurality of switches can be improved. Lead wires of the membrane switch group 23 are brought together into a lead wire 18 and connected to a connector 21, and further connected through the connector 21 to a prescribed electric circuit within the vehicle.

These membrane switches 15, 16 and the membrane switch group 23 are arranged on portions of the pad upper wall 8a except for the breaking portion 8b, and the lead wires 17, 18 to connect these switches 15, 16 and the switch group 23 to the connector 21 are arranged along the side wall portions 8c, 8d. Since the switches 15, 16, the switch group 23 and the lead wires 17, 18 are not arranged, across the breaking portion 8b of the pad upper wall 8a, when the expansion of the air bag 7 is accompanied by the breaking of the pad upper wall 8a, the breaking portion 8b of the upper wall 8a can be smoothly broken.

In this embodiment, although the membrane switches 15, 16 are arranged on the upper surface of the upper wall 8a of the pad 8, they may be arranged on the rear surface of the upper wall 8a.

What is claimed is:

1. A steering wheel which is provided with a ring portion, a boss portion arranged at the center of the ring portion, a spoke portion connecting between the ring portion and the boss portion, and an air bag device comprising:
    (a) an air bag capable of being expanded at a prescribed time;
    (b) an inflater supplying gas to expand said air bag;
    (c) a backup plate arranged on an upper side of said boss portion for holding said air bag and said inflater;
    (d) a pad formed in box shape with an upper wall and a side wall extending downward from a periphery of the upper wall, and covering an upper side and lateral side of said air bag and connecting the side wall to said backup plate and having a breakopen area for releasing said air bag and defined by a thinned breaking portion on the upper wall for breaking the upper wall open while leaving a part of the upper wall outside said area connected to the side wall when said air bag is expanded;
    (e) a plurality of membrane switches arranged at portions of the upper wall of said pad remote from said thinned breaking portion so as not to cross said thinned breaking portion and comprising a pair of electrodes in thin film shape;

(f) a connector arranged at a lower side of said boss portion and connected to a prescribed electric circuit; and (g) lead wires connecting said membrane switches to said connector electrically, and arranged along the pad side wall adjacent said part of the upper wall of said pad, said lead wires being remote from said thinned breaking portion so as not to cross said thinned breaking portion.

2. A steering wheel as set forth in claim 1, wherein at least one among the plurality of membrane switches function as a horn switch.

3. A steering wheel as set forth in claim 1 wherein said breaking portion is in the shape of an H and the upper wall above and below the H includes the said upper wall part which remains connected to the side wall when the air bag is expanded.

4. A steering wheel which is provided with a ring portion, a boss portion arranged at the center of the ring portion, a spoke portion connecting between the ring portion and the boss portion, and an air bag device installed on an upper side of the boss portion, said air bag device comprising:

an air bag capable of being expanded at a prescribed time;

an inflater supplying gas to expand said air bag;

a backup plate arranged on an upper side of said boss portion for holding said air bag and said inflater;

a pad formed in box shape with an upper wall and a side wall extending downward from a periphery of the upper wall, and covering an upper side and lateral side of said air bag and connecting the side wall to said backup plate and having a breakopen area for releasing said air bag and defined by a thinned breaking portion on the upper wall for breaking the upper wall open while leaving a part of the upper wall outside said area connected to the side wall when said air bag is expanded;

a plurality of membrane switches arranged at portions of the upper wall of said pad remote from said thinned breaking portion so as not to cross said thinned breaking portions and comprising a pair of electrodes in thin film shape; and lead wires operatively connecting said plurality of membrane switches to a prescribed electric circuit, said lead wires being arranged remote from said thinned breaking portion so as not to cross said thinned breaking portion.

5. A steering wheel as set forth in claim 4 wherein said breaking portion is in the shape of an H and the upper wall above and below the H includes the said upper wall part which remains connected to the side wall when the air bag is expanded.

* * * * *